United States Patent
Kasori et al.

(10) Patent No.: US 12,269,914 B2
(45) Date of Patent: Apr. 8, 2025

(54) POLYMERIZABLE COMPOSITION FOR OPTICAL MATERIALS AND USE THEREOF

(71) Applicant: MITSUI CHEMICALS, INC., Tokyo (JP)

(72) Inventors: Yuuki Kasori, Omuta (JP); Shinsuke Ito, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 659 days.

(21) Appl. No.: 17/611,368

(22) PCT Filed: May 15, 2020

(86) PCT No.: PCT/JP2020/019409
§ 371 (c)(1),
(2) Date: Nov. 15, 2021

(87) PCT Pub. No.: WO2020/230882
PCT Pub. Date: Nov. 19, 2020

(65) Prior Publication Data
US 2022/0213256 A1   Jul. 7, 2022

(30) Foreign Application Priority Data
May 16, 2019   (JP) ................. 2019-092679

(51) Int. Cl.
| | |
|---|---|
| *G02B 1/04* | (2006.01) |
| *C08G 18/10* | (2006.01) |
| *C08G 18/40* | (2006.01) |
| *C08G 18/48* | (2006.01) |
| *C08G 18/52* | (2006.01) |
| *C08G 18/61* | (2006.01) |
| *C08G 18/71* | (2006.01) |
| *C08G 18/75* | (2006.01) |
| *C08G 18/76* | (2006.01) |
| *C08G 77/46* | (2006.01) |
| *C08K 5/00* | (2006.01) |
| *G02C 7/10* | (2006.01) |

(52) U.S. Cl.
CPC ............ *C08G 18/52* (2013.01); *C08G 18/10* (2013.01); *C08G 18/4009* (2013.01); *C08G 18/4829* (2013.01); *C08G 18/4837* (2013.01); *C08G 18/61* (2013.01); *C08G 18/71* (2013.01); *C08G 18/758* (2013.01); *C08G 18/7621* (2013.01); *C08G 77/46* (2013.01); *C08K 5/0041* (2013.01); *G02B 1/041* (2013.01); *G02C 7/102* (2013.01)

(58) Field of Classification Search
CPC ...... G01B 1/041; C08G 18/758; C08G 18/61; C08G 18/48; C08G 18/71; C08G 18/10; C08G 18/4829; C08G 18/4009; C08G 18/7621
See application file for complete search history.

(56) References Cited

U.S. PATENT DOCUMENTS

| | | |
|---|---|---|
| 2018/0022860 A1 | 1/2018 | Ito et al. |
| 2019/0284324 A1 | 9/2019 | Ribeiro et al. |
| 2020/0233117 A1 | 7/2020 | Ogawa et al. |

FOREIGN PATENT DOCUMENTS

| | | |
|---|---|---|
| JP | 2019066827 A | 4/2019 |
| WO | 2016125786 A1 | 8/2016 |
| WO | 2018070383 A1 | 4/2018 |
| WO | 2018155475 A1 | 8/2018 |

OTHER PUBLICATIONS

Alexandridis et al., "Poly(ethylene oxide)-poly(propylene oxide)-poly(ethylene oxide) block copolymer surfactants in aqueous solutions and at interfaces: thermodynamics, structure, dynamics, and modeling": Physicochem Eng. Aspects, 96 (1995), pp. 1-46.

*Primary Examiner* — Michael L Leonard
(74) *Attorney, Agent, or Firm* — BUCHANAN INGERSOLL & ROONEY PC

(57) ABSTRACT

A polymerizable composition for optical materials of the present invention contains (A) a polyisocyanate compound, (B) a polythiol compound, (C) a photochromic compound, (D) a polyether compound having a number-average molecular weight of 50 to 10,000, and (E) a polyether-modified siloxane compound having a viscosity of 1 mPa·s or more and less than 1,600 mPa·s.

16 Claims, No Drawings

POLYMERIZABLE COMPOSITION FOR OPTICAL MATERIALS AND USE THEREOF

TECHNICAL FIELD

The present invention relates to a polymerizable composition for optical materials that contains a photochromic compound, and an optical material and a plastic lens that are obtained from the composition.

BACKGROUND ART

Hitherto, the development of plastic lenses having photochromic performance has been in progress.

Patent Document 1 discloses a polymerizable composition for optical materials that contains a polythiol compound, a polyisocyanate compound, a photochromic compound, and a block copolymer component. Patent Document 1 describes that the polymerizable composition for optical materials can provide optical materials excellent in photochromic properties, heat resistance, and mechanical properties.

Patent Document 2 discloses a polymerizable composition for optical materials that contains a predetermined polyether-modified siloxane compound and a polymerizable compound. Patent Document 2 describes that the addition of a predetermined polyether-modified siloxane compound suppresses the formation of striae on a lens.

Patent Document 3 discloses a polymerizable composition for optical materials that contains an allyloxycarbonyl group-containing compound, a radical polymerization initiator, and a polyether-modified siloxane compound. Patent Document 3 describes that the polymerizable composition for optical materials suppresses the occurrence of cracks during polymerization or the breakage during mold release while maintaining excellent transparency.

RELATED DOCUMENT

Patent Document

[Patent Document 1] International Publication No. WO2018/070383
[Patent Document 2] International Publication No. WO2016/125786
[Patent Document 3] International Publication No. WO2018/155475

Non-Patent Document

[Non-Patent Document 1] P. Alexandridis, T. A. Hatton/Colloids Surfaces A: Physicochem. Eng. Aspects 96 (1995) 1-46

SUMMARY OF THE INVENTION

Technical Problem

However, in a case where a polyether-modified siloxane compound is added to a polymerizable composition for optical materials that contains a polymerizable compound, a photochromic compound, and a block copolymer component, sometimes the photochromic performance deteriorates and white turbidity occurs, which leads to the reduction of transparency or the occurrence of striae.

Solution to Problem

As a result of intensive studies, the inventors of the present invention have found that optical materials which have excellent photochromic performance, are inhibited from causing white turbidity, have excellent transparency, and are inhibited from forming striae can be obtained from a composition having a predetermine makeup.

That is, the present invention can be described as below.

[1] A polymerizable composition for optical materials containing (A) a polyisocyanate compound,
(B) a polythiol compound,
(C) a photochromic compound,
(D) a polyether compound having a number-average molecular weight of 50 to 10,000, and
(E) a polyether-modified siloxane compound having a viscosity of 1 mPa·s or more and less than 1,600 mPa·s.

[2] The polymerizable composition for optical materials described in [1], in which the polyether compound (D) is at least one compound selected from a compound represented by the following General Formula (d1) and a compound represented by the following General Formula (d2), and the polyether-modified siloxane compound (E) is a compound represented by the following General Formula (e),

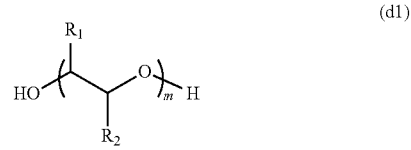

(d1)

wherein, in General Formula (d1), $R_1$ and $R_2$ each represent a hydrogen atom or an alkyl group having 1 to 18 carbon atoms, and at least one of $R_1$ and $R_2$ is a hydrogen atom. A plurality of $R_1$'s may be the same or different from each other, and a plurality of $R_2$'s may be the same or different from each other. m represents an integer of 15 to 500,

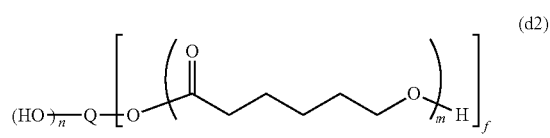

(d2)

wherein, in General Formula (d2), Q represents an (n+f)-valent hydrocarbon group. n represents an integer of 0 or more, f represents an integer of 1 or more, and n+f is 3 or more. m represents an integer of 2 to 58,

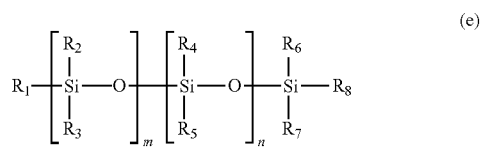

(e)

wherein, in General Formula (e), $R_1$ to $R_8$ may be the same or different from each other, at least one of $R_1$ to $R_8$ represents a polyether group represented by the following General Formula (i), and the rest of $R_1$ to $R_8$ may be the same or different from each other and each represent a linear or branched alkyl group having 1 to 20 carbon atoms, a linear or branched alkoxy group having 1 to 20 carbon atoms, a hydroxyl group, or a polysiloxy group. A plurality of $R_2$'s to $R_5$'s may be the same or different from each other. m and n may be the same or different from each other and each represent an integer of 0 or more,

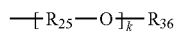 (i)

wherein, in General Formula (i), $R_{25}$ represents a linear or branched alkylene group having 1 to 20 carbon atoms, and $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms. A plurality of $R_{25}$'s may be the same or different from each other. k represents an integer of 1 or more.

[3] The polymerizable composition for optical materials described in [1] or [2], in which the polyether-modified siloxane compound (E) is a compound represented by the following General Formula (e-1), a compound represented by the following General Formula (e-2), or a mixture of these.

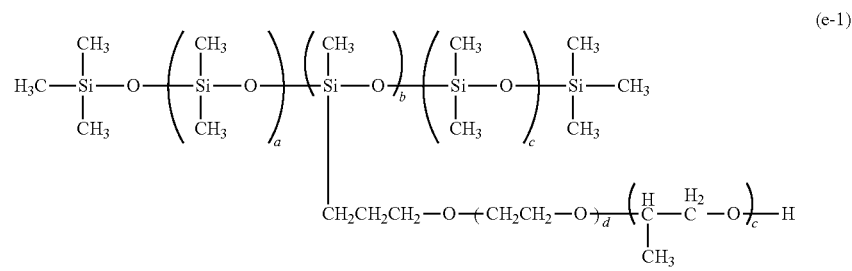 (e-1)

wherein, in General Formula (e-1), a+c is an integer of 1 to 100, b is an integer of 1 to 100, d is an integer of 10 to 1,000, and e is an integer of 1 to 100,

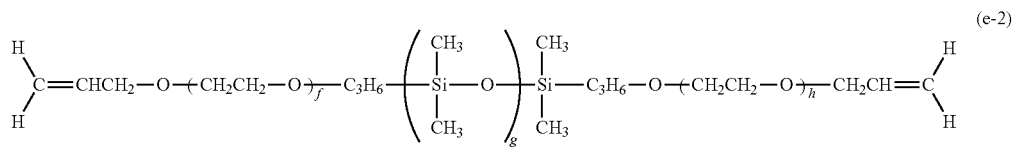 (e-2)

wherein, in General Formula (e-2), f+h is preferably an integer of 1 to 100, and g is an integer of 1 to 100.

[4] The polymerizable composition for optical materials described in any one of [1] to [3], in which the photochromic compound (C) is a compound represented by General Formula (c1) or General Formula (c2).

PC-L-Chain (c1)

PC-L-Chain-L'-PC' (c2)

wherein PC and PC' each represent any of General Formulas (1) to (4). PC and PC' may be the same or different from each other,

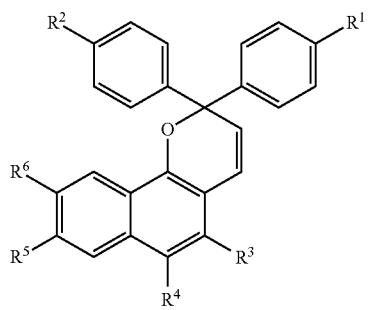

(1)

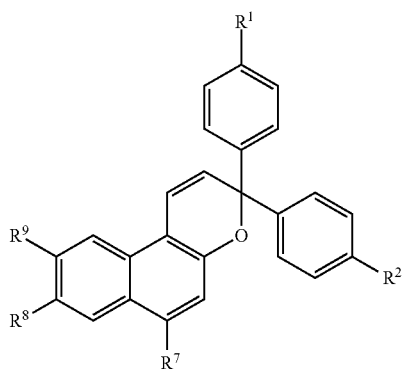

(2)

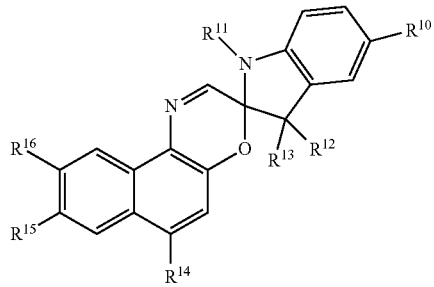

(3)

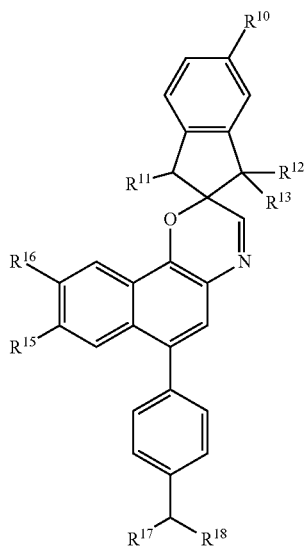

(4)

wherein, in General Formulas (1) to (4), $R^1$ to $R^{18}$ each represent hydrogen, a halogen atom, a carboxyl group, an acetyl group, a formyl group, a C1-C20 aliphatic group which is optionally substituted, a C3-C20 alicyclic group which is optionally substituted, or a C6-C20 aromatic organic group which is optionally substituted. $R_1$ to $R_{18}$ may be the same or different from each other. These aliphatic group, alicyclic group, and aromatic organic group may have an oxygen atom or a nitrogen atom. Any one group contained in the compounds represented by General Formulas (1) to (4) is bonded to L or L' which is a divalent organic group. L and L' each represent a divalent organic group including one or more groups selected from an oxyethylene chain, an oxypropylene chain, a (thio)ester group, and a (thio)amide group. Chain represents a monovalent or divalent organic group including one or more chains selected from a polysiloxane chain and a polyoxyalkylene chain.

[5] The polymerizable composition for optical materials described in any one of [1] to [4], in which the polyisocyanate compound (A) is at least one compound selected from 2,5-bis(isocyanatomethyl)bicyclo-[2.2.1]-heptane, 2,6-bis(isocyanatomethyl)bicyclo-[2.2.1] heptane, m-xylylene diisocyanate, 2,4-tolylene diisocyanate, 2,6-tolylenediisocyanate, dicyclohexylmethane diisocyanate, 1,3-bis(isocyanatomethyl)cyclohexane, 1,4-bis(isocyanatomethyl)cyclohexane, isophorone diisocyanate, 1,6-hexamethylene diisocyanate, and 1,5-pentamethylene diisocyanate.

[6] The polymerizable composition for optical materials described in any one of [1] to [5], in which the polythiol compound (B) is at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), bis(mercaptoethyl)sulfide, pentaerythritol tetrakis(2-mercaptoacetate), 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[7] The polymerizable composition for optical materials described in any one of [1] to [6], in which a content of the polyether-modified siloxane compound (E) is 0.001% to 2% by weight.

[8] The polymerizable composition for optical materials described in any one of [1] to [7], in which a ratio of a content of the polyether-modified siloxane compound (E) with respect to a content of the polyether compound (D) (E (parts by weight)/D (parts by weight)) is 0.01 to 1.0.

[9] The polymerizable composition for optical materials described in any one of [1] to [8], further including a microphase-separated structure of the polyether compound (D).

[10] A molded product obtained by curing the polymerizable composition for optical materials described in anyone of [1] to [9].

[11] The molded product described in [10], including a microphase-separated structure of the polyether compound (D).

[12] An optical material formed of the molded product described in [10] or [11].

[13] A plastic lens composed of the molded product described in [10] or [11].

[14] A method for manufacturing a polymerizable composition for optical materials, including a step of mixing together a polyisocyanate compound (A), a photochromic compound (C), a polyether compound (D) which has a number-average molecular weight of 50 to 10,000, and a polyether-modified siloxane compound (E) which has a viscosity of 1 mPa·s or more and less than 1,600 mPa·s, and a step of mixing a mixed solution obtained by the above step with a polythiol compound (B).

[15] The method for manufacturing a polymerizable composition for optical materials described in [14], in which the polyether compound (D) is at least one compound selected from a compound represented by the following General Formula (d1) and a compound represented by the following General Formula (d2), and the polyether-modified siloxane compound (E) is a compound represented by the following General Formula (e);

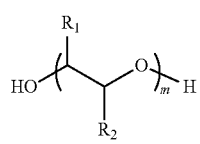

wherein, in General Formula (d1), $R_1$ and $R_2$ each represent a hydrogen atom or an alkyl group having 1 to 18 carbon atoms, and at least one of $R_1$ and $R_2$ is a hydrogen atom. A plurality of $R_1$'s may be the same or different from each other, and a plurality of $R_2$'s may be the same or different from each other. m represents an integer of 15 to 500,

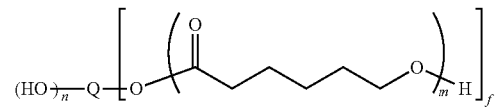

wherein, in General Formula (d2), Q represents an (n+f)-valent hydrocarbon group. n represents an integer of 0 or more, f represents an integer of 1 or more, and n+f is 3 or more. m represents an integer of 2 to 58,

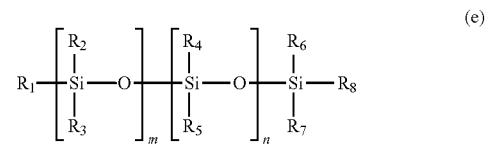

wherein, in General Formula (e), $R_1$ to $R_8$ may be the same or different from each other, at least one of $R_1$ to $R_8$ represents a polyether group represented by the following General Formula (i), and the rest of $R_1$ to $R_8$ may be the same or different from each other and each represent a linear or branched alkyl group having 1 to 20 carbon atoms, a linear or branched alkoxy group having 1 to 20 carbon atoms, a hydroxyl group, or a polysiloxy group. A plurality of $R_2$'s to $R_5$'s may be the same or different from each other. m and n may be the same or different from each other and each represent an integer of 0 or more,

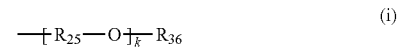

wherein, in General Formula (i), $R_{25}$ represents a linear or branched alkylene group having 1 to 20 carbon atoms, and $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms. A plurality of $R_{25}$'s may be the same or different from each other. k represents an integer of 1 or more.

[16] The method for manufacturing a polymerizable composition for optical materials described in [14] or [15], in which the polyether-modified siloxane compound (E) is a compound represented by the following General Formula (e-1), a compound represented by the following General Formula (e-2), or a mixture of these,

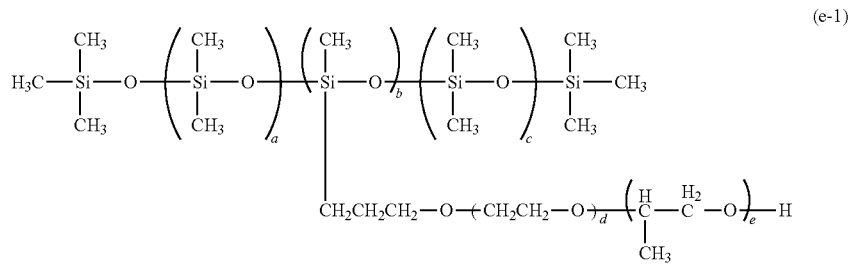

(e-1)

wherein, in General Formula (e-1), a+c is an integer of 1 to 100, b is an integer of 1 to 100, d is an integer of 10 to 1,000, and e is an integer of 1 to 100,

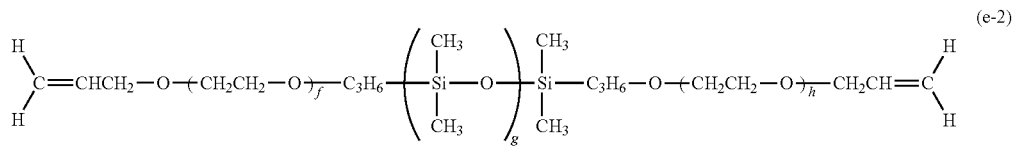

(e-2)

wherein, in General Formula (e-2), f+h is preferably an integer of 1 to 100, and g is an integer of 1 to 100.

Advantageous Effects of Invention

The polymerizable composition for optical materials of the present invention can provide optical materials which have excellent photochromic performance, are inhibited from causing white turbidity, have excellent transparency, are inhibited from forming striae, and look beautiful. In other words, the polymerizable composition for optical materials of the present invention can provide optical materials having these properties that are well balanced.

DESCRIPTION OF EMBODIMENTS

The polymerizable composition for optical materials according to the present invention will be described based on the following embodiments. In the present embodiment, unless otherwise specified, "A to B" represents "A or more" and "B or less".

The polymerizable composition for optical materials of the present embodiment contains a polyisocyanate compound (A), a polythiol compound (B), a photochromic compound (C), a polyether compound (D), and a polyether-modified siloxane compound (E). Hereinafter, each component will be described.

[Polyisocyanate Compound (A)]

As the polyisocyanate compound (A), conventionally known compounds can be used as long as the compounds bring about the effects of the present invention. Examples of the compounds include an aliphatic isocyanate compound, an alicyclic isocyanate compound, an aromatic isocyanate compound, a heterocyclic isocyanate compound, an aromatic aliphatic isocyanate compound, and the like. One of these may be used alone, or two or more of these may be used by being mixed together. These isocyanate compounds may include a dimer, a trimer, and a prepolymer. Examples of these isocyanate compounds include the compounds exemplified in WO2011/055540.

The polyisocyanate compound (A) is preferably at least one compound selected from 2,5-bis(isocyanatomethyl)bi-cyclo-[2.2.1]-heptane, 2,6-bis(isocyanatomethyl)bicyclo-[2.2.1] heptane, m-xylylene diisocyanate, 2,4-tolylene diisocyanate, 2,6-tolylene diisocyanate, dicyclohexylmethane diisocyanate, 1,3-bis(isocyanatomethyl)cyclohexane, 1,4-bis(isocyanatomethyl)cyclohexane, isophorone diisocyanate, 1,6-hexamethylene diisocyanate, and 1,5-pentamethylene diisocyanate, and more preferably at least one compound selected from 2,5-bis(isocyanatomethyl)bicyclo-[2.2.1]-heptane, 2,6-bis(isocyanatomethyl)bicyclo-[2.2.1]-heptane, and bis(isocyanatomethyl)cyclohexane.

[Polythiol Compound (B)]

The polythiol compound (B) is a compound having two or more mercapto groups. Conventionally known polythiol compounds can be used as long as the compounds bring about the effects of the present invention. Examples thereof include the compounds exemplified in WO2016/125736.

In the present embodiment, from the viewpoint of effects of the present invention, the polythiol compound (B) is preferably at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), bis(mercaptoethyl)sulfide, pentaerythritol tetrakis(2-mercaptoacetate), 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane, and more preferably at least one compound selected from 4-mercaptomethyl-1,8-dimercapto-3,6-dithiaoctane, pentaerythritol tetrakis(3-mercaptopropionate), pentaerythritol tetrakis(2-mercaptoacetate), and 2,5-bis(mercaptomethyl)-1,4-dithiane.

[Photochromic Compound (C)]

The photochromic compound is a compound which has a molecular structure reversibly changing by the irradiation with light of a specific wavelength and undergoes change of absorption characteristics (absorption spectrum) by the structural change.

Examples of the photochromic compound (C) used in the present embodiment include compounds whose absorption characteristics (absorption spectrum) change by light of a specific wavelength.

In the present embodiment, the photochromic compound (C) is not particularly limited. From the conventionally known photochromic compounds that can be used in photochromic lenses, any compound can be appropriately selected and used. For example, it is possible to use one compound or two or more compounds among a spiropyran-based compound, a spirooxazine-based compound, a fulgide-based compound, a naphthopyran-based compound, a bisimidazole compound, and the like, depending on the desired color to be added. In the present embodiment, it is preferable to use a naphthopyran-based compound as the photochromic compound (C).

In the present embodiment, it is preferable to use at least one photochromic compound selected from General Formula (c1) and General Formula (c2).

PC-L-Chain (c1)

PC-L-Chain-L'-PC' (c2)

PC and PC' each represent a monovalent group derived from the compounds represented by General Formulas (1) to (4). PC and PC' may be the same or different from each other.

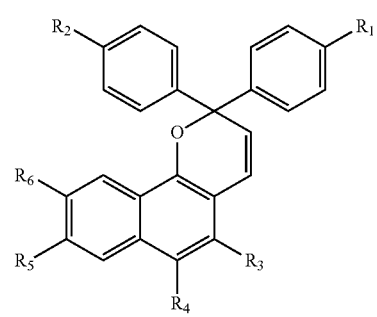

(1)

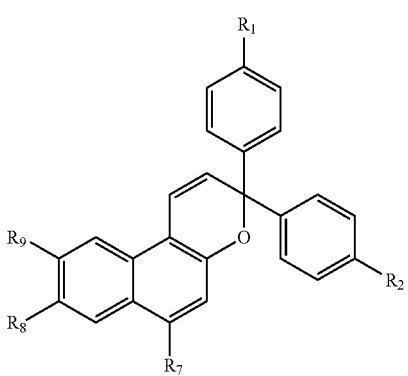

(2)

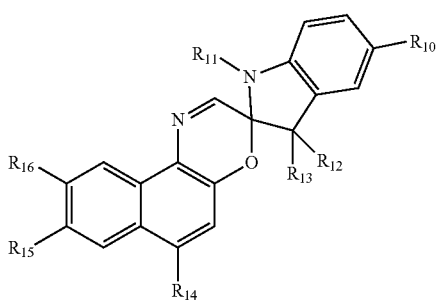

(3)

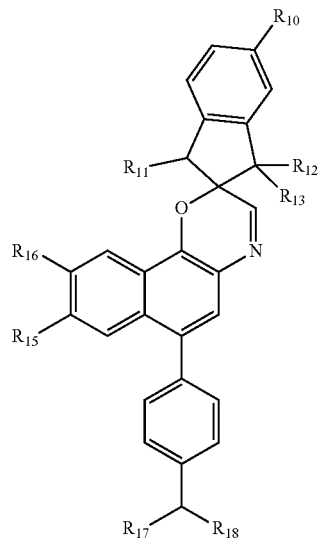

(4)

In Formulas (1) to (4), $R_1$ to $R_{18}$ each represent hydrogen, a halogen atom, a carboxyl group, an acetyl group, a formyl group, a C1-C20 aliphatic group which is optionally substituted, a C3-C20 alicyclic group which is optionally substituted, or a C6-C20 aromatic organic group which is optionally substituted. $R_1$ to $R_{18}$ may be the same or different from each other. These aliphatic group, alicyclic group, and aromatic organic group may have an oxygen atom or a nitrogen atom. Any one group contained in the compounds represented by General Formulas (1) to (4) is bonded to L or L' which is a divalent organic group.

Examples of the C1-C20 aliphatic group which is optionally substituted include a linear or branched C1-C10 alkyl group, a linear or branched C1-C10 alkoxy group, a linear or branched C2-C10 alkenyl group, a C1-C10 hydroxyalkyl group, a C1-C10 hydroxyalkoxy group, a C1-C10 alkyl group substituted with a C1-C10 alkoxy group, a C1-C10 alkoxy group substituted with a C1-C10 alkoxy group, a C1-C5 haloalkyl group, a C1-C5 dihaloalkyl group, a C1-C5 trihaloalkyl group, a C1-C10 alkylamino group, a C1-C10 aminoalkyl group, a linear or branched C1-C20 alkoxycarbonyl group, and the like.

Examples of the C3-C20 alicyclic group which is optionally substituted include a C3-C20 cycloalkyl group, a C6-C20 bicycloalkyl group, and the like.

Examples of the C6-C20 aromatic organic group which is optionally substituted include a phenyl group, a C7-C16 alkoxyphenyl group, an arylamino group, a diarylamino group, an aryl C1-C5 alkylamino group, a cyclic amino group, an arylcarbonyl group, and aroyl group, and the like.

As $R_1$ and $R_2$, for example, a hydrogen atom; a halogen atom;
   a C1-C20 aliphatic group which is optionally substituted, such as a linear or branched C1-C10 alkyl group, a linear or branched C1-C10 alkoxy group, a C1-C10 hydroxyalkoxy group, a C1-C10 alkoxy group substituted with a C1-C10 alkoxy group, a C1-C5 haloalkyl group, a C1-C5 dihaloalkyl group, a C1-C5 trihaloalkyl group, or a C1-C5 alkylamino group;
   a C6-C20 aromatic organic group which is optionally substituted, such as a phenyl group, a C7-C16 alkoxyphenyl group, a C1-C5 dialkylamino group, an arylamino group, a diarylamino group, an aryl C1-C5 alkylamino group, or a cyclic amino group; and the like are preferable. $R_1$ and $R_2$ may be the same or different from each other.

As $R_3$, for example, a hydrogen atom; a halogen atom; a carboxyl group; an acetyl group;
- a C1-C20 aliphatic group which is optionally substituted, such as a linear or branched C1-C10 alkyl group, a linear or branched C2-C10 alkenyl group, a linear or branched C1-C10 alkoxy group, a C1-C10 hydroxyalkyl group, a C1-C10 alkyl group substituted with a C1-C10 alkoxy group, a C1-C10 aminoalkyl group, or a linear or branched C1-C20 alkoxycarbonyl group;
- a C3-C20 alicyclic group which is optionally substituted, such as a C3-C20 cycloalkyl group or a C6-C20 bicycloalkyl group;
- a C6-C20 aromatic organic group which is optionally substituted, such as an arylcarbonyl group, a formyl group, or an aroyl group; and the like are preferable.

As $R_4$, for example, a hydrogen atom; a halogen atom; a carboxyl group; an acetyl group; a formyl group;
- a C1-C20 aliphatic group which is optionally substituted, such as a linear or branched C1-C10 alkyl group, a linear or branched C2-C10 alkenyl group, a linear or branched C1-C10 alkoxy group, a C1-C10 hydroxyalkyl group, a C1-C10 alkyl group substituted with a C1-C10 alkoxy group, a C1-C10 aminoalkyl group, or a linear or branched C1-C20 alkoxycarbonyl group;
- a C3-C20 alicyclic group which is optionally substituted, such as a C3-C20 cycloalkyl group or a C6-C20 bicycloalkyl group;
- a C6-C20 aromatic organic group which is optionally substituted, such as an arylcarbonyl group, an aroyl group, a phenyl group, a C7-C16 alkoxyphenyl group, a C1-C10 dialkoxyphenyl group, a C1-C10 alkylphenyl group, or a C1-C10 dialkylphenyl group; and the like are preferable.

$R_3$ and $R_4$ may be bonded to each other. In a case where $R_3$ and $R_4$ are bonded to each other to form a ring structure, for example, a structure represented by General Formula (5) or (6) is formed. The portion of the dotted line represents a bond between a carbon atom to which $R_3$ is bonded and a carbon atom to which $R_4$ is bonded.

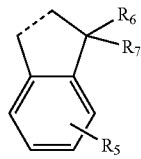

(5)

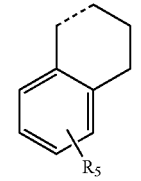

(6)

$R_5$, $R_6$, $R_7$, $R_8$, $R_9$, $R_{10}$, $R_{14}$, $R_{15}$, and $R_{16}$ represent the same functional group as $R_1$ and $R_2$. A plurality of $R_5$'s to $R_7$'s may be the same or different from each other.

As $R_{11}$, for example, a hydrogen atom; a halogen atom; a C1-C20 aliphatic group which is optionally substituted, such as a linear or branched C1-C20 alkyl group, a C1-C5 haloalkyl group, a C1-C5 dihaloalkyl group, or a C1-C5 trihaloalkyl group;
- a C3-C20 alicyclic group which is optionally substituted, such as a C3-C20 cycloalkyl group, a C6-C20 bicycloalkyl group, a C3-C20 cycloalkyl group substituted with a C1-C5 alkyl group, or a C6-C20 bicycloalkyl group substituted with a C1-C5 alkyl group; a C6-C20 aromatic organic group which is optionally substituted, such as an aryl group substituted with a C1-C5 alkyl group; and the like are preferable.

As $R_{12}$ and $R_{13}$, for example, a hydrogen atom; a halogen atom;
- a C1-C20 aliphatic group which is optionally substituted, such as a C1-C10 alkyl group or a C1-C5 alkylalkoxycarbonyl group; a C3-C20 alicyclic group which is optionally substituted, such as a C5-C7 cycloalkyl group; and the like are preferable.

As $R_{17}$ and $R_{18}$, for example, a hydrogen atom; a halogen atom;
- a C1-C20 aliphatic group which is optionally substituted, such as a linear or branched C1-C10 alkyl group or a C1-C10 hydroxyalkyl group; a C3-C20 alicyclic group which is optionally substituted, such as a C5-C7 cycloalkyl group; and the like are preferable.

L and L' in General Formula (c1) or (c2) each represent a divalent organic group including at least one group selected from an oxyethylene chain, an oxypropylene chain, a (thio) ester group, and a (thio) amide group.

Specifically, L and L' are represented by General Formulas (7) to (13). L and L' may be the same or different from each other.

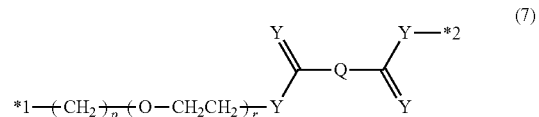

(7)

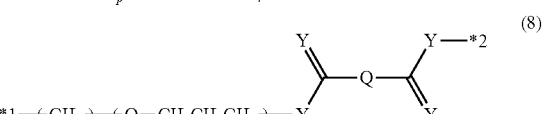

(8)

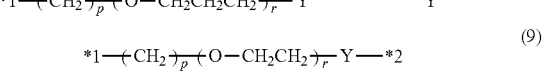

(9)

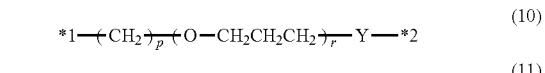

(10)

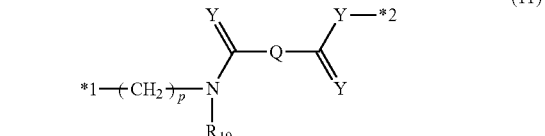

(11)

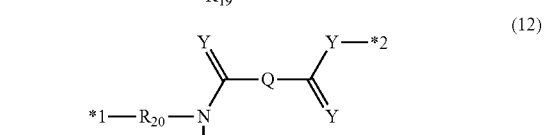

(12)

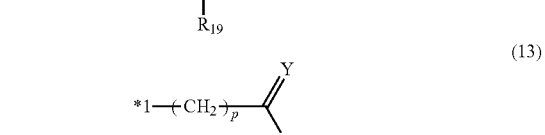

(13)

In Formulas (7) to (13),
Y represents oxygen or sulfur.

$R_{19}$ represents hydrogen or a linear or branched C1-C10 alkyl group.

$R_{20}$ represents a linear or branched C1-C10 alkyl group.

p represents an integer of 0 to 15, and r represents an integer of 0 to 10.

Q represents a linear or branched C1-C10 alkylene group, a C1-C10 alkenylene group, a divalent group derived from a substituent aryl group at the 1,2-, 1,3-, or 1,4-position, a divalent group derived from a substituent heteroaryl group, and the like.

*1 and *2 each represent a bond. *1 is bonded to a monovalent or divalent organic group represented by "Chain", and *2 is bonded to a monovalent organic group represented by PC or PC'.

"Chain" in General Formula (c1) or (c2) represents a monovalent or divalent organic group having at least one chain selected from a polysiloxane chain and a polyoxyalkylene chain.

Examples of the polysiloxane chain include a polydimethylsiloxane chain, a polymethylphenylsiloxane chain, a polymethylhydrosiloxane chain, and the like.

Examples of the polyoxyalkylene chain include a polyoxyethylene chain, a polyoxypropylene chain, a polyoxyhexamethylene chain, and the like.

Specifically, in a case where the photochromic compound is represented by General Formula (c1), "Chain" represents a monovalent organic group represented by General Formula (14) or (15).

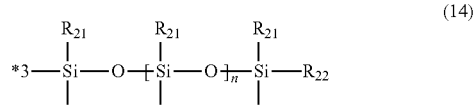

(14)

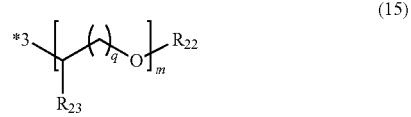

(15)

In a case where the photochromic compound is represented by General Formula (c2), "Chain" represents a divalent organic group represented by General Formula (16) or (17).

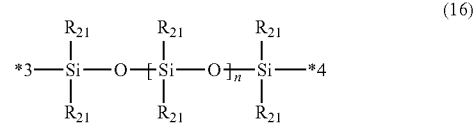

(16)

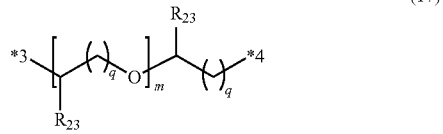

(17)

In Formulas (14) to (17), $R_{21}$ represents a linear or branched C1-C10 alkyl group.

$R_{22}$ represents a linear or branched C1-C10 alkyl group.

$R_{23}$ represents hydrogen, a methyl group, or an ethyl group.

n represents an integer of 4 to 75, and m represents an integer of 1 to 50.

q represents an integer of 1 to 3.

*3 and *4 each represent a bond. *3 is bonded to a divalent organic group represented by L, and *4 is bonded to a divalent organic group represented by L'.

The photochromic compound (C) of the present embodiment is obtained by the methods described in WO2009/146509, WO2010/20770, WO2012/149599, and WO2012/162725.

Examples of the photochromic compound (C) of the present embodiment include Reversacol Humber Blue (polydimethylsiloxane chain, naphthopyran-based chromophore (General Formula (1)), Reversacol Calder Blue (polydimethylsiloxane chain, naphthopyran-based chromophore (General Formula (1)), Reversacol Trent Blue (polydimethylsiloxane chain, naphthopyran-based chromophore (General Formula (1)), Reversacol Pennine Green (polydimethylsiloxane chain, naphthopyran-based chromophore (General Formula (1)), Reversacol Heath Green (polyoxyalkylene chain, naphthopyran-based chromophore (General Formula (1)), Reversacol Chilli Red (polydimethylsiloxane chain, naphthopyran-based chromophore (General Formula (1)), Reversacol Wembley Grey (polyoxyalkylene chain, naphthopyran-based chromophore (General Formula (1)), and Reversacol Cayenne Red (polyoxyalkylene chain, naphthopyran-based chromophore (General Formula (1)), Peacock Blue (polyoxyalkylene chain, naphthopyran-based chromophore (General Formula (1)), Jalapeno Red (polyoxyalkylene chain, naphthopyran-based chromophore (General Formula (1)) manufactured by Vivimed Labs Limited, and the like. One photochromic compound can be used alone, or two or more photochromic compounds can be used in combination.

In the present embodiment, it is preferable to use at least one compound selected from Reversacol Trent Blue, Reversacol Heath Green, Reversacol Chilli Red, Reversacol Wembley Grey, Reversacol Cayenne Red, Peacock Blue, Jalapeno Red.

The photochromic compound (C) can also be added using a premix of the photochromic compound (C) and the polyisocyanate compound (A). The total amount of the polyisocyanate compound (A) used in the present embodiment includes the amount of the polyisocyanate compound (A) used in the premix.

[Polyether Compound (D)]

The polyether compound (D) is at least one compound selected from compounds having a number-average molecular weight of 50 to 10,000. The number-average molecular weight of the polyether compound (D) is preferably 100 to 8,000, more preferably 500 to 5,000, even more preferably 1,000 to 4,000, and particularly preferably 1,500 to 3,500.

The polyether compound (D) to be used can be selected from known compounds having a number-average molecular weight in the above range, as long as the compounds can bring about the effects of the present invention.

The polyether compound (D) is preferably at least one compound selected from a compound (d1) represented by the following General Formula (d1) and a compound (d2) represented by the following General Formula (d2).

(Compound (d1))

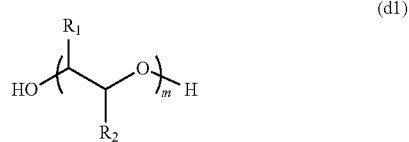

(d1)

In General Formula (d1), $R_1$ and $R_2$ each represent a hydrogen atom or an alkyl group having 1 to 18 carbon atoms, and at least one of $R_1$ and $R_2$ is a hydrogen atom. A plurality of $R_1$'s may be the same or different from each other, and a plurality of $R_2$'s may be the same or different from each other. m represents an integer of 15 to 500, and preferably represents an integer of 30 to 500.

As the compound represented by General Formula (d1), it is possible to use a compound which has a number-average molecular weight of 150 or more and preferably has a number-average molecular weight of 200 or more.

As the compound (d1), specifically, a compound represented by the following General Formula (d1-1) and a compound represented by General Formula (d1-2) can be used.

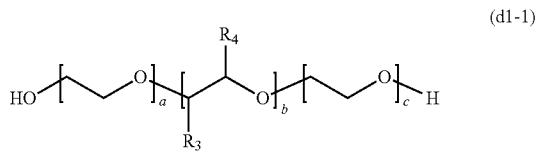

(d1-1)

In General Formula (d1-1), $R_3$ and $R_4$ each represent a hydrogen atom or an alkyl group having 1 to 18 carbon atoms, and at least one of $R_3$ and $R_4$ is a hydrogen atom. a+c is an integer which is 2 to 600, and preferably 2 to 400. b represents an integer which is 1 to 300, and preferably 1 to 100. A plurality of $R_3$'s and $R_4$'s may be the same or different from each other.

Examples of such a compound include the Pluronic series manufactured by BASF SE. The structures of the compounds included in Pluronic are shown in Non-Patent Document 1.

Sometimes the terminal hydroxyl group of the compound represented by General Formula (d1) may react with a polymerizable compound such as isocyanate.

Specifically, examples of the compound represented by General Formula (d1-1) include a compound represented by the following General Formula (d1-1').

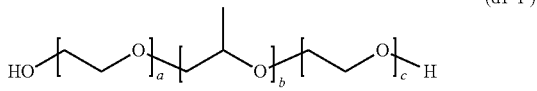

(d1-1')

In General Formula (d1-1'), a, b, and c each represent the number of units. a, b, and c each independently represent an integer of 3 to 300.

Examples of such a compound include the Pluronic series (manufactured by BASF SE), and the like.

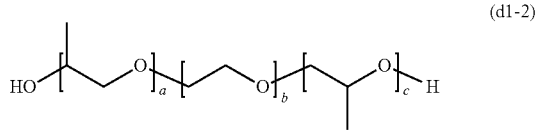

(d1-2)

In General Formula (d1-2), a, b, and c each represent the number of units. a, b, and c each independently represent an integer of 3 to 300.

Examples of such a compound include the Pluronic R series (manufactured by BASF SE) and the like.

(Compound (d2))

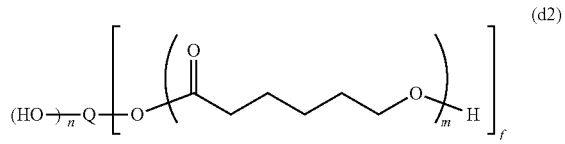

(d2)

In General Formula (d2), Q represents an (n+f)-valent hydrocarbon group. n represents an integer of 0 or more, f represents an integer of 1 or more, and n+f is 3 or more. m represents an integer of 2 to 58.

In General Formula (d2), the $(HO)_n$—R—$(O)_f$— group is a group having a valence of 3 or more which is derived from a polyol having three or more primary hydroxyl groups.

Examples of the compound (d2) include CAPA (R) polycaprolactone polyol (manufactured by PERSTORP), PLACCEL (R) (manufactured by Daicel Corporation), and the like.

[Polyether-Modified Siloxane Compound (E)]

The polyether-modified siloxane compound (E) is at least one compound selected from compounds having a viscosity of 1 mPa·s or more and less than 1,600 mPa·s. The viscosity of the polyether-modified siloxane compound (E) is preferably 5 to 1,000 mPa·s, more preferably 10 to 500 mPa·s, even more preferably 15 to 400 mPa·s, and particularly preferably 20 to 200 mPa·s.

The polyether-modified siloxane compound (E) to be used can be selected from known compounds having a viscosity in the above range, as long as the compounds can bring about the effects of the present invention.

As the polyether-modified siloxane compound (E), for example, it is preferable to use a compound represented by the following General Formula (e).

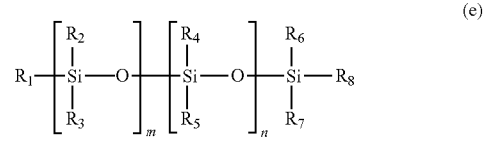

(e)

$R_1$ to $R_8$ may be the same or different from each other, at least one of $R_1$ to $R_8$ represents a polyether group represented by the following General Formula (i), and the rest of $R_1$ to $R_8$ may be the same or different from each other and each represent a linear or branched alkyl group having 1 to 20 carbon atoms, a linear or branched alkoxy group having 1 to 20 carbon atoms, a hydroxyl group, or a polysiloxy group. A plurality of $R_2$'s to $R_5$'s may be the same or different from each other. m and n may be the same or different from each other and each represent an integer of 0 or more, preferably represent an integer of 1 to 20, and more preferably represent an integer of 1 to 10.

(i)

In General Formula (i), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms. A plurality of $R_{25}$'s may be the same or different from each other. k represents an integer of 1 or more.

k which represents the number of polymerized polyether moieties can be appropriately selected from integers of 1 or more. k preferably represents an integer of 1 to 20, and more preferably represents an integer of 1 to 10.

In one embodiment, from the viewpoint of effects of the present invention, k preferably represents an integer of 1 to 1,000, more preferably represents an integer of 40 to 600, and even more preferably represents an integer of 55 to 550.

In one embodiment, $R_{26}$ of the polyether group represented by General Formula (i) preferably represents a hydrogen atom or a linear or branched alkyl group having 1 to 20 carbon atoms.

In one embodiment, $R_{26}$ of the polyether group represented by General Formula (i) represents a linear or branched alkenyl group having 2 to 20 carbon atoms or a linear or branched alkynyl group having 2 to 20 carbon atoms.

In one embodiment, from the viewpoint of effects of the present invention, $R_{26}$ of the polyether group represented by General Formula (i) is preferably a hydrogen atom or a linear or branched alkenyl group having 2 to 20 carbon atoms, and more preferably a hydrogen atom or a linear or branched alkenyl group having 2 to 8 carbon atoms.

Specific examples of the substituents in the above General Formula (e) include the following groups.

Examples of the linear or branched alkylene group having 1 to 20 carbon atoms include a methylene group, an ethylene group, a n-propylene group, an isopropylene group, a n-butylene group, an isobutylene group, a t-butylene group, a n-pentylene group, an isopentylene group, a t-pentylene group, a n-hexylene group, a n-heptylene group, an isoheptylene group, a n-octylene group, an isooctylene group, a n-nonylene group, an isononylene group, a n-decylene group, an isodecylene group, a n-undecylene group, an isoundecylene group, a n-dodecylene group, an isododecylene group, a cyclopentylene group, a cyclohexylene group, a cycloheptylene group, a cyclooctylene group, a cyclononylene group, a methylcyclopentylene group, a methylcyclohexylene group, and the like. Among these, a linear or branched alkylene group having 1 to 8 carbon atoms is preferable.

Examples of the linear or branched alkyl group having 1 to 20 carbon atoms include a methyl group, an ethyl group, a n-propyl group, an isopropyl group, a n-butyl group, an isobutyl group, a t-butyl group, a n-pentyl group, an isopentyl group, a t-pentyl group, a n-hexyl group, a n-heptyl group, an isoheptyl group, a n-octyl group, an isooctyl group, a n-nonyl group, an isononyl group, a n-decyl group, an isodecyl group, a n-undecyl group, an isoundecyl group, a n-dodecyl group, an isododecyl group, a cyclopentyl group, a cyclohexyl group, a cycloheptyl group, a cyclooctyl group, a cyclononyl group, a methylcyclopentyl group, a methylcyclohexyl group, and the like.

Among these, a linear or branched alkyl group having 1 to 8 carbon atoms is preferable.

Examples of the linear or branched alkoxy group having 1 to 20 carbon atoms include a methoxy group, an ethoxy group, a n-propyloxy group, an isopropyloxy group, a n-butyloxy group, an isobutyloxy group, a t-butyloxy group, a n-pentyloxy group, an isopentyloxy group, a t-pentyloxy group, a n-hexyloxy group, a n-heptyloxy group, an isoheptyloxy group, a n-octyloxy group, an isooctyloxy group, a n-nonyloxy group, an isononyloxy group, a n-decyloxy group, an isodecyloxy group, a n-undecyloxy group, an isoundecyloxy group, a n-dodecyloxy group, an isododecyloxy group, a cyclopentyloxy group, a cyclohexyloxy group, a cycloheptyloxy group, a cyclooctyloxy group, a cyclononyloxy group, a methylcyclopentyloxy group, a methylcyclohexyloxy group, and the like.

Among these, a linear or branched alkoxy group having 1 to 8 carbon atoms is preferable.

Examples of the linear or branched alkenyl group having 2 to 20 carbon atoms include a vinyl group, a 1-propenyl group, a 2-propenyl group, a 1-butenyl group, a 2-butenyl group, a 3-butenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a 6-heptenyl group, a 7-octenyl group, a 8-nonenyl group, a 9-decenyl group, a 2-methyl-1-propenyl group, a 2-methyl-2-propenyl group, a 3-methyl-3-butenyl group, a 4-methyl-4-pentenyl group, a 2-cyclohexyl-2-propenyl group, and the like.

Among these, a linear or branched alkenyl group having 2 to 8 carbon atoms is preferable.

Examples of the linear or branched alkynyl group having 2 to 20 carbon atoms include an ethynyl group, a 1-propynyl group, a 2-propynyl group, a 1-butynyl group, a 2-butynyl group, a 3-butynyl group, a 2-methyl-2-propynyl group, a 3-methyl-1-butynyl group, a 4-pentynyl group, a 5-hexynyl group, a 6-heptynyl group, a 7-octynyl group, a 8-nonynyl group, a 9-decynyl group, and the like.

Among these, a linear or branched alkynyl group having 2 to 8 carbon atoms is preferable.

Examples of the compound represented by General Formula (e) include POLYFLOW KL-100, POLYFLOW KL-600, and GLANOL 410 (trade name, manufactured by KYOEISHA CHEMICAL Co., LTD.);

BYK-302, BYK-307, BYK-322, BYK-323, BYK-331, BYK-333, BYK-347, BYK-348, and BYK-349 (trade name, manufactured by BYK-Chemie GmbH);

KF-351, KF-353, KF-354L, KF-355, KF-355A, KF-615A, and KF-618 (trade name, manufactured by Shin-Etsu Chemical Co., Ltd.);

SH3746, SH3771, SH8400, and SF8410 (trade name, manufactured by Dow Corning Toray Co., Ltd.);

TSF4440, TSF4445, TSF4446, and TSF4452 (trade name, manufactured by Toshiba Silicones Co., Ltd.); and the like. However, the present invention is not limited to these example compounds. One of these may be used alone, or two or more of these may be used as a mixture.

Among the above examples, POLYFLOW KL-100 and POLYFLOW KL-600 (trade name manufactured by KYOEISHA CHEMICAL Co., LTD.) are particularly preferable.

From the viewpoint of effects of the present invention, the compound represented by General Formula (e) is preferably one or more compounds selected from POLYFLOW KL-100 and POLYFLOW KL-600 (trade name manufactured by KYOEISHA CHEMICAL Co., LTD.), and more preferably POLYFLOW KL-100.

From the viewpoint of effects of the present invention, the polyether-modified siloxane compound (E) preferably includes at least one compound selected from a compound represented by General Formula (e) in which $R_{26}$ of the polyether group represented by General Formula (i) is a hydrogen atom and a compound represented by General Formula (e) in which $R_{26}$ of the polyether group represented by General Formula (i) is a linear or branched alkenyl group having 2 to 20 carbon atoms;

more preferably includes at least one compound selected from a compound represented by General Formula (e) in which $R_{26}$ of the polyether group represented by General Formula (i) is a hydrogen atom and a compound represented by General Formula (e) in which $R_{26}$ of the polyether group represented by General Formula (i) is a linear or branched alkenyl group having 2 to 8 carbon atoms;

even more preferably includes at least one compound selected from a compound represented by General Formula (e) in which $R_{26}$ of the polyether group represented by General Formula (i) is a hydrogen atom and a compound represented by General Formula (e) in which $R_{26}$ of the polyether group represented by General Formula (i) is a linear or branched alkenyl group having 2 to 8 carbon atoms; and still more preferably includes a compound represented by the following General Formula (e-1) and a compound represented by the following General Formula (e-2).

From the same viewpoint as above, the molecular weight of the compound represented by the above General Formula (e-2) is preferably 100 to 10,000, and more preferably 500 to 5,000.

In a case where the polyether-modified siloxane compound (E) includes the compounds represented by General Formula (e-1) and General Formula (e-2), from the viewpoint of effects of the present invention, the mass ratio of the compound represented by General Formula (e-1) and the compound represented by General Formula (e-2) in the polyether-modified siloxane compound (E) is set, so that the ratio of the mass of the compound represented by General Formula (e-1) to the total mass of the compound represented by General Formula (e-1) and the compound represented by General Formula (e-2) is preferably 50% to 90%, and more preferably 60% to 80%.

[Other Components]

In the present embodiment, the polymerizable composition may further contain an internal release agent, an ultraviolet absorber, a hindered amine-based light stabilizer, a

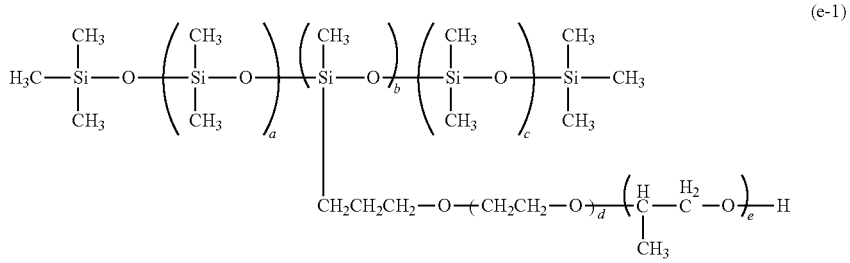

(e-1)

From the viewpoint of effects of the present invention, a+c in the above General Formula (e-1) is preferably an integer of 1 to 100, and more preferably an integer of 5 to 50.

From the same viewpoint as above, b in the above General Formula (e-1) is preferably an integer of 1 to 100, and more preferably an integer of 5 to 50.

From the same viewpoint as above, d in the above General Formula (e-1) is preferably an integer of 10 to 1,000, and more preferably an integer of 50 to 500.

From the same viewpoint as above, e in the above General Formula (e-1) is preferably an integer of 1 to 100, and more preferably an integer of 5 to 50.

From the same viewpoint as above, the molecular weight of the compound represented by the above General Formula (e-1) is preferably 100 to 10,000, and more preferably 1,000 to 5,000.

dye, a resin modifier, a polymerization catalyst, and the like, in addition to the aforementioned components (A) to (E).

As the internal release agent, an acidic phosphoric acid ester or unreactive silicone oil can be used. Examples of the acidic phosphoric acid ester include a phosphoric acid monoester and a phosphoric acid diester. One of these can be used alone, or two or more of these esters can be used in combination.

Examples of the ultraviolet absorber include various ultraviolet absorbers such as a benzotriazole-based ultraviolet absorber, a triazine-based ultraviolet absorber, a benzophenone-based ultraviolet absorber, a benzoate-based ultraviolet absorber, a propanedioic acid ester-based ultraviolet absorber, and an oxanilide-based ultraviolet absorber. One of these can be used alone, or two or more of these can be used in combination.

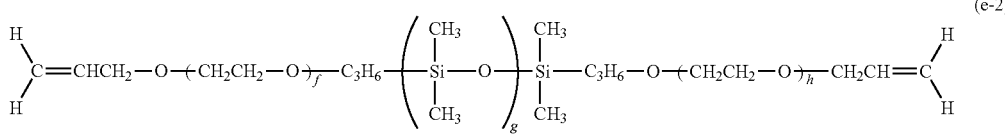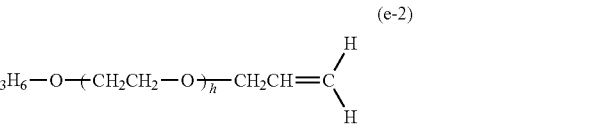

(e-2)

From the viewpoint of effects of the present invention, f+h in the above General Formula (e-2) is preferably an integer of 1 to 100, and more preferably an integer of 1 to 20.

From the same viewpoint as above, g in the above General Formula (e-2) is preferably an integer of 1 to 100, and more preferably an integer of 1 to 10.

Examples of the dye include an anthraquinone-based dye, a perinone-based dye, a monoazo-based dye, a diazo-based dyes, a phthalocyanine-based dye, and the like. One of these can be used alone, or two or more of these can be used in combination.

Examples of the resin modifier include olefin compounds including a polyoxyalkylene alkyl ether compound, a polyoxyalkylene fatty acid ester, an episulfide compound, an alcohol compound, an amine compound, an epoxy compound, an organic acid and anhydrides thereof, a (meth) acrylate compound, and the like. One of these can be used alone, or two or more of these can be used in combination.

<Polymerizable Composition for Optical Materials>

The polymerizable composition for optical materials of the present embodiment contains the aforementioned components (A) to (E) and contains, if necessary, other components.

The ratio of the polyisocyanate compound (A) and the polythiol compound (B) used is not particularly limited. Generally, a molar ratio of SH group/NCO group is in a range of 0.5 to 3.0, preferably in a range of 0.6 to 2.0, and more preferably in a range of 0.8 to 1.3.

From the viewpoint of photochromic performance, the ratio of the photochromic compound (C) with respect to 100 parts by weight of the polyether compound (D) is 0.01 to 100 parts by weight, and more preferably 1 to 10 parts by weight.

From the viewpoint of effects of the present invention, the amount of the polyether compound (D) used can be set such that the content of the compound (D) with respect to 100% by weight of the polymerizable composition for optical materials is 0.5% to 10% by weight, preferably 1.0% to 9.0% by weight, and more preferably 2.0% to 8.0% by weight.

From the viewpoint of effects of the present invention, the amount of the polyether-modified siloxane compound (E) used can be set such that the content of the compound (E) with respect to 100% by weight of the polymerizable composition for optical materials is 0.001% to 2% by weight, and preferably 0.01% to 1% by weight.

From the viewpoint of effects of the present invention, the ratio of the content of the polyether-modified siloxane compound (E) to the content of the polyether compound (D) (E (parts by weight)/D (parts by weight)) can be set such that the ratio is 0.01 to 1.0, preferably 0.05 to 0.5, more preferably 0.10 to 0.40, and even more preferably 0.15 to 0.20. In a case where the polyether compound (D) is used, the larger the amount of the compound (D) added, the further the photochromic performance is improved, but the further the striae tend to occur, which means that there is a trade-off relationship between the improvement of photochromic performance and the suppression of striae. In the present invention, the ratio (E/D) is in the above range. As a result, both the improvement of photochromic performance and the suppression of striae can be accomplished, and optical materials can be obtained which have higher photochromic performance, further inhibited from forming striae, and look beautiful (have excellent transparency). In other words, the polymerizable composition for optical materials of the present invention can provide optical materials having these properties that are well balanced.

The polymerizable composition for optical materials of the present embodiment can be prepared by mixing together the aforementioned components (A) to (E) and, if necessary, other components described above.

In the present embodiment, it is preferable that the polymerizable composition for optical materials be prepared by a manufacturing method including Step a of mixing together the polyisocyanate compound (A), the photochromic compound (C), the polyether compound (D), and the polyether-modified siloxane compound (E), and a step b of mixing the mixed solution obtained by Step a with the polythiol compound (B).

Step a can also be a step of preparing a premix of the photochromic compound (C) and the polyisocyanate compound (A) and mixing the premix with the polyisocyanate compound (A), the polyether compound (D), and the polyether-modified siloxane compound (E).

Depending on the preparation conditions, sometimes the polyether compound (D) forms a microphase-separated structure in some parts of the polymerizable composition for optical materials in the present embodiment.

<Cured Product>

It is possible to obtain a cured product by polymerizing and curing the polymerizable composition for optical materials in the present embodiment. The molded product of the present embodiment contains a microphase-separated structure of the polyether compound (D), the photochromic compound (C), and a thiourethane resin obtained by polymerizing the polyisocyanate compound (A) and the polythiol compound (B). Examples of the microphase-separated structure include polymer particles (micellar particles) having a microphase-separated structure composed of the polyether compound (D). The cured product including the microphase-separated structure can provide an optical material excellent in photochromic properties, heat resistance, and mechanical properties.

At least a part of the photochromic compound (C) may be encapsulated in the microphase-separated structure composed of the polyether compound (D). In this case, the effects described above are particularly excellent.

The 50% volume-based average particle size of the polymer particles, which are a microphase-separated structure, is 1 nm to 1,000 nm. This structure can be confirmed using a transmission electron microscope.

(Microphase-Separated Structure)

The microphase-separated structure will be described below. A block copolymer is a polymer consisting of a plurality of different copolymer moieties connected to each other through covalent bonds. These copolymer moieties have different physical properties and affinities. For example, in an amphipathic block copolymer, the copolymer moieties tend to separate from each other due to strong repulsive force and are not intermixed just as water and oil, which leads to phase separation. However, because the copolymer moieties are chemically bonded to each other, complete macroscopic phase separation found in a simple mixture of two homopolymers does not occur. On the other hand, in the microphase separation of a block copolymer consisting of different copolymer moieties A and B, a microaggregate of a moiety rich in the copolymer A and a moiety rich in the copolymer B is formed. As a result, depending on the structure of block copolymer, several morphologies such as nano-sized spherical polymer micelles can be observed. Details of the microphase separation of such a block copolymer are described, for example, in a reference (Chem. Soc. Rev., 2012, 41, 5969-5985). By having a microphase-separated structure such as polymer particles including a microphase-separated structure, the obtained cured product can have transparency with less turbidity.

The method for manufacturing the cured product of the present embodiment includes a step of polymerizing and curing the polymerizable composition for optical materials. Specifically, in this step, the polyisocyanate compound (A) and the polythiol compound (B) are polymerized to form a resin, the polyether compound (D) forms a microphase-separated structure, and a molded product consisting of the resin, the microphase-separated structure, and the photochromic compound (C) is formed.

In this step, by heating or irradiating the polymerizable composition for optical materials with radiation other than infrared rays, such as ultraviolet rays, it is possible to polymerize and cure the composition and to obtain a cured product. The polymerization conditions are appropriately selected.

<Molded Product>

In order to manufacture the resin that is obtained by heating and polymerizing the composition of the present embodiment and to manufacture a molded product formed of the resin, if necessary, various additives described above and the like are added. Furthermore, as long as the effects of the present embodiment are not impaired, polymerizable compounds, additives, and the like that are not described in the present application may be added to the composition in the present embodiment. Just as the cured product, the molded product of the present embodiment includes a microphase-separated structure of the polyether compound (D).

<Use>

In the present embodiment, by varying the shape of molds used in polymerizing the aforementioned polymerizable composition for optical materials, it is possible to obtain molded products in various shapes and optical materials formed of the molded products. The molded product of the present embodiment that is shaped as desired and provided with a coat layer, other members, and the like formed as needed can be used as various optical materials.

Examples of the optical materials include a plastic lens, alight emitting diode (LED), a prism, optical fiber, an information recording substrate, a filter, and the like. Particularly, the optical materials are suitable as a plastic lens.

<Plastic Lens>

The plastic lens of the present embodiment is usually manufactured by a cast polymerization method using the aforementioned polymerizable composition for optical materials. Specifically, the method for manufacturing the plastic lens of the present embodiment includes a step of performing cast polymerization on the polymerizable composition for optical materials so as to form a lens substrate.

In this step, the obtained composition of the present embodiment is injected into a cavity consisting of a cavity mold and a gasket or tape and heated so that the composition is polymerized and cured. In this way, a resin of the present embodiment and a plastic lens substrate formed of the resin is manufactured. By this step, the polyisocyanate compound (A) and the polythiol compound (B) are polymerized to form a resin, and the polyether compound (D) forms a microphase-separated structure, which makes it possible to obtain a plastic lens substrate formed of the resin, the microphase-separated structure, and the photochromic compound (C).

The polymerization conditions are not limited because they greatly vary with the type and used amount of the polymerizable composition for optical materials and the catalyst, the mold shape, and the like. Generally, the polymerization is performed for 1 to 50 hours at −50° C. to 150° C. In some cases, it is preferable to cure the composition for 1 to 25 hours at a temperature that is fixed or slowly raised within a range of 10° C. to 150° C.

If necessary, after being released from the mold, the obtained plastic lens may be subjected to a re-heating treatment (annealing).

The surface of the cured resin of the present embodiment and the surface of the plastic lens composed of the resin may be provided with functional coat layers such as a hardcoat, an antireflection coat, a light controlling coat, a lubricating coat or a lubricating treatment, and an antistatic coat. Furthermore, for the surface of the cured resin and the plastic lens, a coloring treatment for fashion, a surface or edge polishing treatment, and the like may be performed. In addition, a polarizing film may be put into the resin or the plastic lens or attached to the surface of the resin or the plastic lens so that the polarizing properties are added, and various types of processing for adding functions may also be performed.

The plastic lens of the present embodiment can be used as various lenses such as a spectacle lens, a camera lens, a pickup lens, a Fresnel lens, a prism lens, and a lenticular lens. The plastic lens is particularly preferably used as a spectacle lens, a camera lens, and a pickup lens having a smooth surface, among the above.

Hitherto, the embodiments of the present invention have been described. However, the embodiments are merely examples of the present invention, and various configurations other than the above can be adopted as long as the effects of the present invention are not impaired.

EXAMPLE

Hereinafter, the present invention will be more specifically described with reference to examples, but the present invention is not limited thereto. The transparency and striae of the molded product manufactured in examples and comparative examples were evaluated by the following methods.

Transparency

Transparency was evaluated based on a devitrification level. First, a circular plate-like lens having a thickness of 9 mm and a diameter of 75 mm was prepared. Then, the lens plate was irradiated with a light source (Luminar Ace LA-150A manufactured by HAYASHI-REPIC CO., Ltd.), and the image was measured using a greyscale imaging device. The captured image was processed into a greyscale image to digitize the devitrification level. Based on the obtained values of devitrification level, transparency was evaluated according to the following criteria. The lens was visually observed as well for evaluation.

3: The devitrification level is less than 150 (transparent).
2: The devitrification level is less than 200 (slight white turbidity occurs, but the lens is transparent).
1: The devitrification level is 200 or more (white turbidity occurs).

Striae

The molded product was illuminated with an ultra-high pressure mercury lamp (light source model OPM-252HEG: manufactured by Ushio Inc.), and the projected image was visually observed to evaluate whether or not striae exist. Striae was evaluated according to the following criteria.

A: No striae
B: There are faint striae in the peripheral portion.
C: Faint striae are observed all over the molded product.
D: Moderate striae are observed all over the molded product.
E: Marked striae are observed all over the molded product.

Example 1

Reversacol Wembley Grey (0.036 parts by weight), 0.060 parts by weight of Reversacol Heath Green, 0.030 parts by weight of Peacock Blue, and 0.024 parts by weight of Jalapeno Red as photochromic compounds manufactured by Vivimed Labs Limited and 0.075 parts by weight of HOSTAVIN PR-25 as an ultraviolet absorber were dissolved in 9.8 parts by weight of a composition containing 2,5-bis (isocyanatomethyl)bicyclo-[2.2.1]-heptane and 2,6-bis(isocyanatomethyl)bicyclo-[2.2.1]-heptane, thereby preparing a master solution. The obtained master solution (10 parts by weight) was added to 30.05 parts by weight of a composition containing 2,5-bis(isocyanatomethyl)bicyclo-[2.2.1]-heptane and 2,6-bis(isocyanatomethyl)bicyclo-[2.2.1]-heptane, followed by stirring. ADEKA PLURONIC L-64 (2.52 parts by weight) manufactured by ADEKA Corporation, 0.05 parts by weight of JP-506H as an acidic phosphoric acid ester manufactured by JOHOKU CHEMICAL CO., LTD, and 0.4 parts by weight of a polyether-modified siloxane compound (POLYFLOW KL-100: manufactured by KYOEISHA CHEMICAL Co., LTD.) were added to the obtained mixed solution, and the obtained mixed solution was stirred for 30 minutes at a temperature of 15° C. to 20° C.

Pentaerythritoltetrakis(3-mercaptopropionate) (19.98 parts by weight) and 27.25 parts by weight of 4-mercaptomethyl-1,8-dimercapto-3,6-dithiaoctane were added to the mixed solution obtained as above, and the mixed solution was stirred for 15 minutes at a temperature of 15° C. to 20° C.

Dimethyltindichloride (0.015 parts by weight) was added to 10 part by weight of a composition containing 2,5-bis (isocyanatomethyl)bicyclo-[2.2.1]-heptane and 2,6-bis(isocyanatomethyl)bicyclo-[2.2.1]-heptane and uniformly dissolved, thereby preparing a solution. This solution was added to the mixed solution obtained as above and stirred for 15 minutes at a temperature of 15° C. to 20° C., thereby obtaining a polymerizable composition.

Thereafter, the polymerizable composition was stirred and degassed for 1 hour at a temperature of 15° C. to 20° C. in an environment with a reduced pressure of 400 Pa or less, then filtered through a 1.0 μm PTFE filter, and cast into a glass mold. The polymerizable composition was polymerized for 48 hours in a range of 10° C. to 130° C., then the mold was taken out of the furnace and removed, and a molded product obtained by the polymerization was taken out.

The molded product was colorless and transparent and had excellent light control performance in which the molded product develops color as soon as being exposed to solar rays and is decolored when the light rays are blocked. The molded product was found to have transparency suitable for optical materials and have no striae. Table 1 shows the evaluation results of the obtained molded products.

Example 2

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.5 parts by weight.

The molded product was colorless and transparent and had excellent light control performance in which the molded product develops color as soon as being exposed to solar rays and is decolored when the light rays are blocked. The molded product was found to have transparency suitable for optical materials and have no striae. Table 1 shows the evaluation results of the obtained molded products.

Example 3

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.05 parts by weight.

The molded product was colorless and transparent and had excellent light control performance in which the molded product develops color as soon as being exposed to solar rays and is decolored when the light rays are blocked. Furthermore, the molded product was found to have transparency suitable for optical materials and have moderate striae all over the molded product. Table 1 shows the evaluation results of the obtained molded products.

Example 4

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.1 parts by weight.

The molded product was colorless and transparent and had excellent light control performance in which the molded product develops color as soon as being exposed to solar rays and is decolored when the light rays are blocked. Furthermore, the molded product was found to have transparency suitable for optical materials and have moderate striae all over the molded product. Table 1 shows the evaluation results of the obtained molded products.

Example 5

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.2 parts by weight.

The molded product was colorless and transparent and had excellent light control performance in which the molded product develops color as soon as being exposed to solar rays and is decolored when the light rays are blocked. Furthermore, the molded product was found to have transparency suitable for optical materials and have moderate striae all over the molded product. Table 1 shows the evaluation results of the obtained molded products.

Example 6

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.3 parts by weight.

The molded product was colorless and transparent and had excellent light control performance in which the molded product develops color as soon as being exposed to solar rays and is decolored when the light rays are blocked. The molded product was found to have transparency suitable for optical materials and have faint striae all over the molded product. Table 1 shows the evaluation results of the obtained molded products.

Example 7

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 1.0 part by weight.

The molded product was colorless and transparent and had excellent light control performance in which the molded product develops color as soon as being exposed to solar rays and is decolored when the light rays are blocked. Furthermore, the molded product was found to have transparency suitable for optical materials and have faint striae in the peripheral portion. Table 1 shows the evaluation results of the obtained molded products.

Example 8

Reversacol Wembley Grey (0.0745 parts by weight) and 0.061 parts by weight of Reversacol Heath Green as photochromic compounds manufactured by Vivimed Labs Limited and 0.075 parts by weight of HOSTAVIN PR-25 as an ultraviolet absorber were dissolved in 9.8 parts by weight of a composition containing 2,5-bis(isocyanatomethyl)bicyclo-[2.2.1]-heptane and 2,6-bis(isocyanatomethyl)bicyclo-[2.2.1]-heptane, thereby preparing a master solution. The obtained master solution (10 parts by weight) was added to 29.99 parts by weight of a composition containing 2,5-bis (isocyanatomethyl)bicyclo-[2.2.1]-heptane and 2,6-bis(isocyanatomethyl)bicyclo-[2.2.1]-heptane, followed by stirring. ADEKA PLURONIC L-64 (1.94 parts by weight) manufactured by ADEKA Corporation, 0.05 parts by weight of JP-506H as an acidic phosphoric acid ester manufactured by JOHOKU CHEMICAL CO., LTD, and 0.1 parts by weight of a polyether-modified siloxane compound (POLYFLOW KL-100: manufactured by KYOEISHA CHEMICAL Co., LTD.) were added to the obtained mixed solution, and the mixed solution was stirred for 30 minutes at a temperature of 15° C. to 20° C.

Pentaerythritoltetrakis(3-mercaptopropionate) (23.35 parts by weight) and 24.92 parts by weight of 4-mercaptomethyl-1,8-dimercapto-3,6-dithiaoctane were added to the mixed solution obtained as above, and the mixed solution was stirred for 15 minutes at a temperature of 15° C. to 20° C.

Dimethyltindichloride (0.025 parts by weight) was added to 10 part by weight of a composition containing 2,5-bis (isocyanatomethyl)bicyclo-[2.2.1]-heptane and 2,6-bis(isocyanatomethyl)bicyclo-[2.2.1]-heptane and uniformly dissolved, thereby preparing a solution. This solution was added to the mixed solution obtained as above and stirred for 15 minutes at a temperature of 15° C. to 20° C., thereby obtaining a polymerizable composition.

Thereafter, the polymerizable composition was stirred and degassed for 1 hour at a temperature of 15° C. to 20° C. in an environment with a reduced pressure of 400 Pa or less, then filtered through a 1.0 μm PTFE filter, and cast into a glass mold. The polymerizable composition was polymerized for 48 hours in a range of 10° C. to 130° C., then the mold was taken out of the furnace and removed, and a molded product obtained by the polymerization was taken out.

The molded product was colorless and transparent and had excellent light control performance in which the molded product develops color as soon as being exposed to solar rays and is decolored when the light rays are blocked. The molded product was found to have transparency suitable for optical materials and have faint striae in the peripheral portion. Table 1 shows the evaluation results of the obtained molded products.

Example 9

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.2 parts by weight.

The molded product was colorless and transparent and had excellent light control performance in which the molded product develops color as soon as being exposed to solar rays and is decolored when the light rays are blocked. The molded product was found to have transparency suitable for optical materials and have faint striae in the peripheral portion. Table 1 shows the evaluation results of the obtained molded products.

Example 10

A polymerizable composition and a molded product were prepared in the same manner as in Example 1, except that the amount of the polyether-modified siloxane compound (POLYFLOW KL-100: manufactured by KYOEISHA CHEMICAL Co., LTD.) added in Example 1 was changed to 0.3 parts by weight.

The molded product was colorless and transparent and had excellent light control performance in which the molded product develops color as soon as being exposed to solar rays and is decolored when the light rays are blocked. The molded product was found to have transparency suitable for optical materials and have faint striae all over the molded product. Table 1 shows the evaluation results of the obtained molded products.

Comparative Example 1

A polymerizable composition and a molded product were prepared in the same manner as in Example 1, except that the polyether-modified siloxane compound (POLYFLOW KL-100: manufactured by KYOEISHA CHEMICAL Co., LTD.) was not added.

The molded product had excellent light control performance in which the molded product develops color as soon as being exposed to solar rays and is decolored when the light rays are blocked. Table 1 shows the results of evaluation on transparency and striae of the molded product.

Comparative Example 2

A polymerizable composition and a molded product were prepared in the same manner as in Example 1, except that the amount of the polyether-modified siloxane compound (KF-352A: manufactured by Shin-Etsu Chemical Co., Ltd.) was changed to 0.5 parts by weight.

The molded product had excellent light control performance in which the molded product develops color as soon as being exposed to solar rays and is decolored when the light rays are blocked. Table 1 shows the results of evaluation on transparency and striae of the molded product.

Comparative Example 3

A polymerizable composition and a molded product were prepared in the same manner as in Example 1, except that the amount of the polyether-modified siloxane compound (X-22-4515: manufactured by Shin-Etsu Chemical Co., Ltd.) was changed to 0.5 parts by weight.

The molded product had excellent light control performance in which the molded product develops color as soon as being exposed to solar rays and is decolored when the light rays are blocked. Table 1 shows the results of evaluation on transparency and striae of the molded product.

TABLE 1

| | A component (Parts by weight) | B component (Parts by weight) | | C component (Parts by weight) | | | | D component (Parts by weight) | E component (ppm) | E (parts by weight)/D (parts by weight) | Transparency | Striae |
|---|---|---|---|---|---|---|---|---|---|---|---|---|
| Example 1 | A1 (49.85) | B1 (27.25) | B2 (19.98) | C1 (0.036) | C2 (0.060) | C3 (0.030) | C4 (0.024) | D1 (2.52) | E1 (4,000) | 0.159 | 3 | A |
| Example 2 | A1 (49.85) | B1 (27.25) | B2 (19.98) | C1 (0.036) | C2 (0.060) | C3 (0.030) | C4 (0.024) | D1 (2.52) | E1 (5,000) | 0.198 | 3 | A |
| Example 3 | A1 (49.85) | B1 (27.25) | B2 (19.98) | C1 (0.036) | C2 (0.060) | C3 (0.030) | C4 (0.024) | D1 (2.52) | E1 (500) | 0.020 | 3 | D |
| Example 4 | A1 (49.85) | B1 (27.25) | B2 (19.98) | C1 (0.036) | C2 (0.060) | C3 (0.030) | C4 (0.024) | D1 (2.52) | E1 (1,000) | 0.040 | 3 | D |
| Example 5 | A1 (49.85) | B1 (27.25) | B2 (19.98) | C1 (0.036) | C2 (0.060) | C3 (0.030) | C4 (0.024) | D1 (2.52) | E1 (2,000) | 0.079 | 3 | D |
| Example 6 | A1 (49.85) | B1 (27.25) | B2 (19.98) | C1 (0.036) | C2 (0.060) | C3 (0.030) | C4 (0.024) | D1 (2.52) | E1 (3,000) | 0.119 | 3 | C |
| Example 7 | A1 (49.85) | B1 (27.25) | B2 (19.98) | C1 (0.036) | C2 (0.060) | C3 (0.030) | C4 (0.024) | D1 (2.52) | E1 (10,000) | 0.397 | 2 | B |
| Example 8 | A1 (49.79) | B1 (24.92) | B2 (23.35) | C1 (0.0745) | C2 (0.061) | — | — | D1 (1.94) | E1 (1,000) | 0.052 | 3 | B |
| Example 9 | A1 (49.79) | B1 (24.92) | B2 (23.35) | C1 (0.0745) | C2 (0.061) | — | — | D1 (1.94) | E1 (2,000) | 0.103 | 3 | B |
| Example 10 | A1 (49.79) | B1 (24.92) | B2 (23.35) | C1 (0.0745) | C2 (0.061) | — | — | D1 (1.94) | E1 (3,000) | 0.155 | 2 | C |
| Comparative Example 1 | A1 (49.85) | B1 (27.25) | B2 (19.98) | C1 (0.036) | C2 (0.060) | C3 (0.030) | C4 (0.024) | D1 (2.52) | — | 0.000 | 3 | E |
| Comparative Example 2 | A1 (49.85) | B1 (27.25) | B2 (19.98) | C1 (0.036) | C2 (0.060) | C3 (0.030) | C4 (0.024) | D1 (2.52) | E2 (5,000) | 0.198 | 1 | E |
| Comparative Example 3 | A1 (49.85) | B1 (27.25) | B2 (19.98) | C1 (0.036) | C2 (0.060) | C3 (0.030) | C4 (0.024) | D1 (2.52) | E3 (5,000) | 0.198 | 1 | E |

The components listed in Table 1 are as follows.

A1: Composition containing 2,5-bis(isocyanatomethyl) bicyclo-[2.2.1]-heptane and 2,6-bis(isocyanatomethyl) bicyclo-[2.2.1]-heptane B1: 4-Mercaptomethyl-1,8-dimercapto-3,6-dithiaoctane B2: Pentaerythritol tetrakis(3-mercaptopropionate)

C1: Reversacol Wembley Grey (polyoxyalkylene chain, naphthopyran-based chromophore (General Formula (1)), manufactured by Vivimed Labs Limited)

C2: Reversacol Heath Green (polyoxyalkylene chain, naphthopyran-based chromophore (General Formula (1)), manufactured by Vivimed Labs Limited)

C3: Peacock Blue (polyoxyalkylene chain, naphthopyran-based chromophore (General Formula (1)), manufactured by Vivimed Labs Limited)

C4: Jalapeno Red (polyoxyalkylene chain, naphthopyran-based chromophore (General Formula (1)), manufactured by Vivimed Labs Limited)

D1: ADEKA PLURONIC L-64 (block copolymer of polyethylene glycol and polypropylene glycol having a number-average molecular weight of 2,900 (General Formula (d1-1')))

E1: POLYFLOW KL-100 (polyether-modified siloxane compound (General Formula (e)), manufactured by KYOEISHA CHEMICAL Co., LTD.)

E2: KF-352A (polyether-modified siloxane compound, manufactured by Shin-Etsu Silicone)

E3: X-22-4515 (polyether-modified siloxane compound, manufactured by Shin-Etsu Silicone)

This application claims a priority based on Japanese Patent Application No. 2019-092679 filed on May 16, 2019, the entire content of which is incorporated into the present specification.

The invention claimed is:

1. A polymerizable composition for optical materials, comprising:
   (A) a polyisocyanate compound;
   (B) a polythiol compound;
   (C) a photochromic compound;
   (D) a polyether compound having a number-average molecular weight of 50 to 10,000; and
   (E) a polyether-modified siloxane compound having a viscosity of 1 mPa·s or more and less than 1,600 mPa·s;
   wherein a ratio of a content of the polyether-modified siloxane compound (E) with respect to a content of the polyether compound (D) (E (parts by weight)/D (parts by weight)) is 0.01 to 1.0;
   wherein a ratio of the compound (D) with respect to 100% by weight of the polymerizable composition is 1.9 to 8.0% by weight;
   wherein a molar ratio of SH group in the polythiol compound (B) with respect to NCO group in the polyisocyanate compound (A) (SH group/NCO group) is 0.8 to 1.3; and
   wherein a ratio of the photochromic compound (C) with respect to 100 parts by weight of the polyether compound (D) is 1 to 10 parts by weight.

2. The polymerizable composition for optical materials according to claim 1,
   wherein the polyether compound (D) is at least one compound selected from a compound represented by the following General Formula (d1) and a compound represented by the following General Formula (d2), and the polyether-modified siloxane compound (E) is a compound represented by the following General Formula (e),

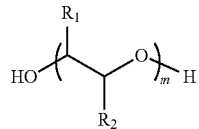
(d1)

wherein, in General Formula (d1), $R_1$ and $R_2$ each represent a hydrogen atom or an alkyl group having 1 to 18 carbon atoms, at least one of $R_1$ and $R_2$ is a hydrogen atom, a plurality of $R_1$'s may be the same or different from each other, a plurality of $R_2$'s may be the same or different from each other, and m represents an integer of 15 to 500,

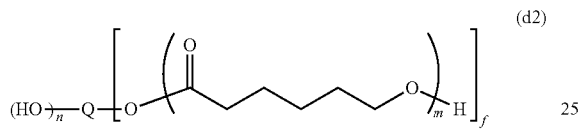
(d2)

wherein, in General Formula (d2), Q represents an (n+f)-valent hydrocarbon group, n represents an integer of 0 or more, f represents an integer of 1 or more, n+f is 3 or more, and m represents an integer of 2 to 58,

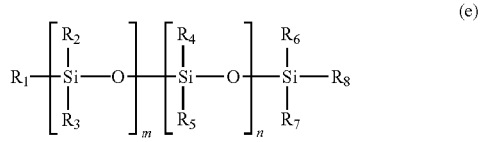
(e)

wherein, in General Formula (e), $R_1$ to $R_8$ may be the same or different from each other, at least one of $R_1$ to $R_8$ represents a polyether group represented by the following General Formula (i) and the rest of $R_1$ to $R_8$ may be the same or different from each other and each represent a linear or branched alkyl group having 1 to 20 carbon atoms, a linear or branched alkoxy group having 1 to 20 carbon atoms, a hydroxyl group, or a polysiloxy group, a plurality of $R_2$'s to $R_5$'s may be the same or different from each other, and m and n may be the same or different from each other and each represent an integer of 0 or more,

(i)

wherein, in General Formula (i), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of $R_{25}$'s may be the same or different from each other, and k represents an integer of 1 or more.

3. The polymerizable composition for optical materials according to claim 1,
wherein the polyether-modified siloxane compound (E) is a compound represented by the following General Formula (e-1), a compound represented by the following General Formula (e-2), or a mixture of these,

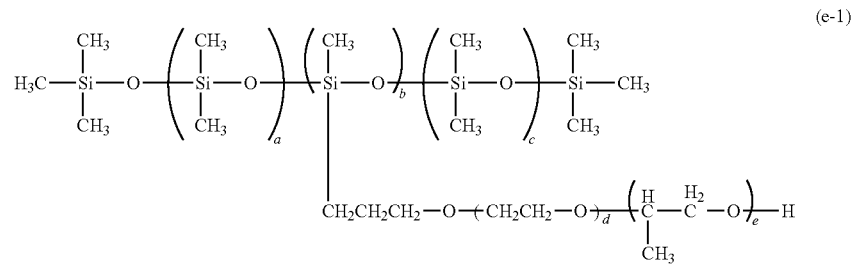
(e-1)

wherein, in General Formula (e-1), a+c is an integer of 1 to 100, b is an integer of 1 to 100, d is an integer of 10 to 1,000, and e is an integer of 1 to 100,

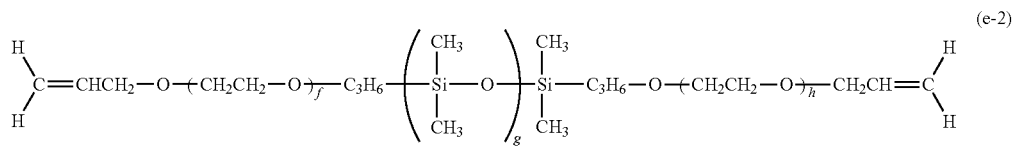
(e-2)

wherein, in General Formula (e-2), f+h is an integer of 1 to 100, and g is an integer of 1 to 100.

4. The polymerizable composition for optical materials according to claim 1,
wherein the photochromic compound (C) is a compound represented by General Formula (c1) or General Formula (c2), PC-L-Chain (c1)

PC-L-Chain-L'-PC' (c2)

wherein PC and PC' each represent any of General Formulas (1) to (4), and PC and PC' may be the same or different from each other,

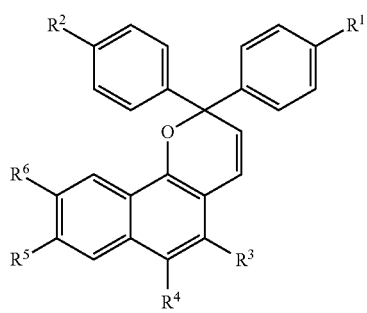
(1)

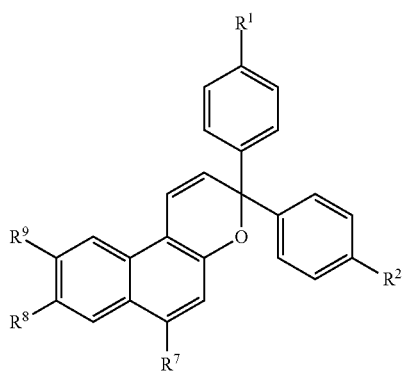
(2)

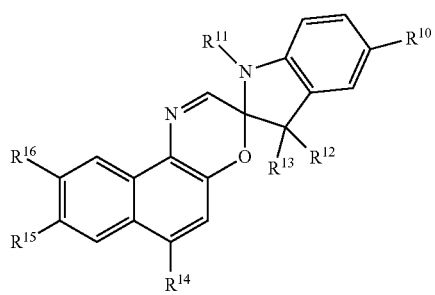
(3)

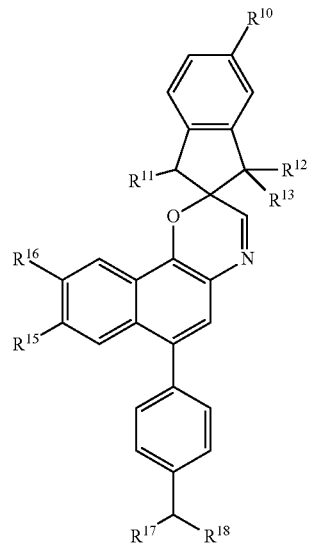
(4)

wherein, in General Formulas (1) to (4), $R^1$ to $R^{18}$ each represent hydrogen, a halogen atom, a carboxyl group, an acetyl group, a formyl group, a C1-C20 aliphatic group which is optionally substituted, a C3-C20 alicyclic group which is optionally substituted, or a C6-C20 aromatic organic group which is optionally substituted, $R^1$ to $R^{18}$ may be the same or different from each other, these aliphatic group, alicyclic group, and aromatic organic group may have an oxygen atom or a nitrogen atom, any one group contained in the compounds represented by General Formulas (1) to (4) is bonded to L or L' which is a divalent organic group, L and L' each represent a divalent organic group including one or more groups selected from an oxyethylene chain, an oxypropylene chain, a (thio)ester group, and a (thio) amide group, and Chain represents a monovalent or divalent organic group including one or more chains selected from a polysiloxane chain and a polyoxyalkylene chain.

5. The polymerizable composition for optical materials according to claim 1,
wherein the polyisocyanate compound (A) is at least one compound selected from 2,5-bis(isocyanatomethyl)bicyclo-[2.2.1]-heptane, 2,6-bis(isocyanatomethyl)bicyclo-[2.2.1]heptane, m-xylylene diisocyanate, 2,4-tolylene diisocyanate, 2,6-tolylene diisocyanate, dicyclohexylmethane diisocyanate, 1,3-bis(isocyanatomethyl)cyclohexane, 1,4-bis(isocyanatomethyl)cyclohexane, isophorone diisocyanate, 1,6-hexamethylene diisocyanate, and 1,5-pentamethylene diisocyanate.

6. The polymerizable composition for optical materials according to claim 1,
wherein the polythiol compound (B) is at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), bis(mercaptoethyl)sulfide, pentaerythritol tetrakis(2-mercaptoacetate), 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

7. The polymerizable composition for optical materials according to claim 1,
wherein a content of the polyether-modified siloxane compound (E) is 0.119% to 2% by weight.

8. The polymerizable composition for optical materials according to claim 1, further comprising:
a microphase-separated structure of the polyether compound (D).

9. A molded product obtained by curing the polymerizable composition for optical materials according to claim 1.

10. The molded product according to claim 9, comprising:
a microphase-separated structure of the polyether compound (D).

11. An optical material comprising:
the molded product according to claim 9.

12. A plastic lens composed of the molded product according to claim 9.

13. A method for manufacturing a polymerizable composition for optical materials, comprising:
a step of mixing together a polyisocyanate compound (A), a photochromic compound (C), a polyether compound (D) having a number-average molecular weight of 50 to 10,000, and a polyether-modified siloxane compound (E) having a viscosity of 1 mPa·s or more and less than 1,600 mPa·s; and
a step of mixing a mixed solution obtained by the above step with a polythiol compound (B);
wherein a ratio of a content of the polyether-modified siloxane compound (E) with respect to a content of the polyether compound (D) (E (parts by weight)/D (parts by weight)) is 0.01 to 1.0;
wherein a ratio of the compound (D) with respect to 100% by weight of the polymerizable composition is 1.9 to 8.0% by weight;
wherein a molar ratio of SH group in the polythiol compound (B) with respect to NCO group in the polyisocyanate compound (A) (SH group/NCO group) is 0.8 to 1.3; and
wherein a ratio of the photochromic compound (C) with respect to 100 parts by weight of the polyether compound (D) is 1 to 10 parts by weight.

14. The method for manufacturing a polymerizable composition for optical materials according to claim 13,
wherein the polyether compound (D) is at least one compound selected from a compound represented by the following General Formula (d1) and a compound represented by the following General Formula (d2), and
the polyether-modified siloxane compound (E) is a compound represented by the following General Formula (e),

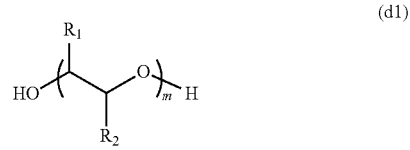

wherein, in General Formula (d1), $R_1$ and $R_2$ each represent a hydrogen atom or an alkyl group having 1 to 18 carbon atoms, at least one of $R_1$ and $R_2$ is a hydrogen atom, a plurality of $R_1$'s may be the same or different from each other, a plurality of $R_2$'s may be the same or different from each other, and m represents an integer of 15 to 500,

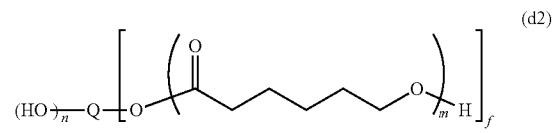

wherein, in General Formula (d2), Q represents an (n+f)-valent hydrocarbon group, n represents an integer of 0 or more, f represents an integer of 1 or more, n+f is 3 or more, and m represents an integer of 2 to 58,

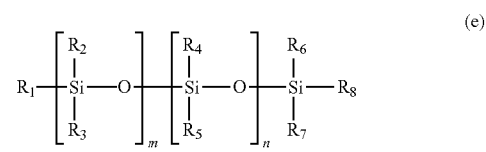

wherein, in General Formula (e), $R_1$ to $R_8$ may be the same or different from each other, at least one of $R_1$ to $R_8$ represents a polyether group represented by the following General Formula (i) and the rest of $R_1$ to $R_8$ may be the same or different from each other and each represent a linear or branched alkyl group having 1 to 20 carbon atoms, a linear or branched alkoxy group having 1 to 20 carbon atoms, a hydroxyl group, or a polysiloxy group, a plurality of $R_2$'s to $R_5$'s may be the same or different from each other, and m and n may be the same or different from each other and each represent an integer of 0 or more,

wherein, in General Formula (i), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of $R_{25}$'s may be the same or different from each other, and k represents an integer of 1 or more.

15. The method for manufacturing a polymerizable composition for optical materials according to claim 13,
wherein the polyether-modified siloxane compound (E) is a compound represented by the following General Formula (e-1), a compound represented by the following General Formula (e-2), or a mixture of these,

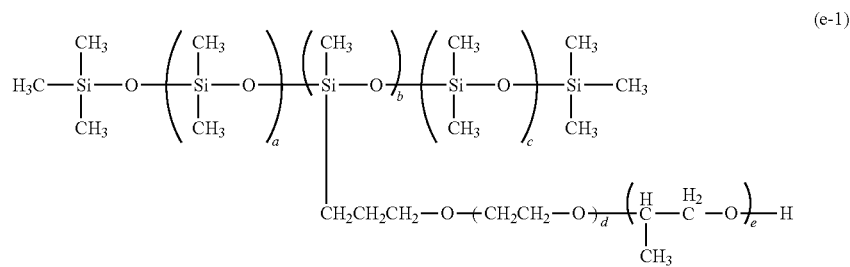

(e-1)

wherein, in General Formula (e-1), a+c is an integer of 1 to 100, b is an integer of 1 to 100, d is an integer of 10 to 1,000, and e is an integer of 1 to 100,

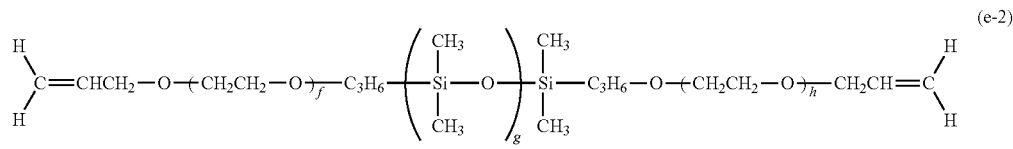

(e-2)

wherein, in General Formula (e-2), f+h an integer of 1 to 100, and g is an integer of 1 to 100.

16. The polymerizable composition for optical materials according to claim 1, wherein the ratio of the content of the polyether-modified siloxane compound (E) with respect to the content of the polyether compound (D) (E (parts by weight)/D (parts by weight) is 0.119 to 0.40.

* * * * *